July 19, 1932.  A. JOSEPH  1,867,842
APPARATUS FOR THE MANUFACTURE OF LIGHT HYDROCARBONS BY
CATALYTIC CRACKING OF PETROLEUM OILS, TARS, OR
OTHER SIMILAR STARTING MATERIALS
Filed Dec. 22, 1928  2 Sheets-Sheet 1

Fig. 1.

Inventor
Alfred Joseph
By
Cameron, Kerkam & Sutton.
Attorneys

July 19, 1932. A. JOSEPH 1,867,842
APPARATUS FOR THE MANUFACTURE OF LIGHT HYDROCARBONS BY
CATALYTIC CRACKING OF PETROLEUM OILS, TARS, OR
OTHER SIMILAR STARTING MATERIALS
Filed Dec. 22, 1928 2 Sheets-Sheet 2

INVENTOR.
Alfred Joseph.
By Cameron, Kerkam and Sutton.
Attorneys.

Patented July 19, 1932

1,867,842

UNITED STATES PATENT OFFICE

ALFRED JOSEPH, OF ENGHEIN, FRANCE, ASSIGNOR, BY MESNE ASSIGNMENTS, TO HOUDRY PROCESS CORPORATION, OF DOVER, DELAWARE, A CORPORATION OF DELAWARE

APPARATUS FOR THE MANUFACTURE OF LIGHT HYDROCARBONS BY CATALYTIC CRACKING OF PETROLEUM OILS, TARS, OR OTHER SIMILAR STARTING MATERIALS

Application filed December 22, 1928, Serial No. 328,013, and in France October 24, 1928.

In a previous application filed December 22, 1928, Serial No. 328,012, for " process and apparatus for the catalytic cracking of petroleum oils, tars, and other similar purposes", the applicant has described and illustrated a process and an apparatus for the catalytic cracking of petroleum and other similar starting materials.

The present invention relates to processes and apparatus for carrying out the methods and apparatus for catalytic cracking described and illustrated in the above cited application and enabling the obtainment in a continuous manner, in conjunction with these methods and apparatus, of light hydrocarbons generally utilizable at the outlet from the assemblage of plant.

The processes and apparatus for catalytic cracking described in the cited application, comprises the employment of vaporizing apparatus for the oils or other similar products, connected to chambers wherein the cracking is effected in the presence of contact materials or catalysts, the said chambers being themselves connected, by their outlet, to dephlegmators from which escape the light products, whereas the heavy products separated are led to a new vaporizer-catalyzer-dephlegmator group, and so on, a purifying contrivance being optionally interposed between the catalyzer apparatus and the dephlegmator of each group.

According to the present invention, the plant which comprises a plurality of vaporizer-catalyzer-dephlegmator groups, preferably arranged in closed circuit for use with circular permutation, is completed by groups connected to each of the dephlegmators or to a plurality thereof, such groups enabling the carrying out of a refining of the light products issuing from the said dephlegmators.

An embodiment of the assemblage of plant is illustrated diagrammatically, by way of example, in the attached drawings wherein Fig. 1 illustrates diagrammatically a plant which includes two vaporizer-catalyzer-dephlegmator groups, and a common refining apparatus for the cracked products separated out in the several dephlegmators of said groups, and Fig. 2 illustrates in greater detail a single vaporizer-catalyzer-dephlegmator group, and the refining unit.

In the drawings, A designates a tank, charged with petroleum oil or any other similar starting material, and serving to supply one or several groups of apparatus such as those about to be described herein. Each of the groups comprises a vaporizing apparatus B.

In the example illustrated, this apparatus is in the form of an annular container, closed at its two ends, and comprising, in its upper portion a series of baffle plates $b$, whereas in its lower portion and on a perforated false bottom $B^1$, is a charge of contact material $b^1$, such as a metal or a metal oxide for example, on a porcelain or other support of inert material.

The vaporizer which, in practice, is heated to a temperature in the neighborhood of 350°–450° C., receives through its upper end, the oil coming from a reservoir A, but previously heated to a temperature of about 150° C, in a serpentine or other suitable heater $A^1$. This first heating is, preferably and in accordance with the invention, followed by a second heating to a temperature in the neighborhood of 200° C., which ensures a suitable fluidification of the oil and brings it to a state in which its vaporization can be effected rapidly following entry into the vaporizer B. The heater $A^2$ may be constituted by a column comprising a series of baffle plates $a^2$.

At the upper portion of the vaporizer B, steam is admitted in a suitably regulated quantity, such steam being produced in a vaporization chamber $C^1$ supplied with water derived from a vat C, which, like the oil reservoir A, can be common to a series of cracking groups, that is to say in effect to a series of vaporizers.

The oil fluidified at the outlet from the heater $A^2$, admitted mixed with a suitable proportion of steam coming from $C^1$, is rapidly vaporized in thin layers on the baffle plates $b$, in the higher portion of the vaporizers B.

The solid residues deposit themselves, in a convenient state of division on the porous material with which the lower portion of the vaporizer is charged.

The vaporizer apparatus comprises, at its lower portion, a pipe $b^2$ provided with a cock and a siphon for running off and evacuating non vaporized products, and pipes D, $b^3$, $b^4$ likewise provided with cocks, and serving the one D for the outlet of vapours and the others $b^3$ and $b^4$ respectively for the periodical inlet and outlet of a regenerating agent such as air or oxygen which enables the deposits which have become effected on the contact material, to be burnt, At the outlet from the vaporizer, the oil vapours pass, by the pipe D, into a catalytic cracking chamber. This chamber E is preferably constructed in accordance with the prior application filed December 22, 1928, Serial No. 328,011 by the applicant, the title of which is: "Process and apparatus for the treatment of gas or a mixture of gas and vapour in the presence of catalytic agents and for the reactivation of such agents." The chamber is constituted by a container closed at its two ends and charged, between two perforated false bottoms $E^1$, $E^2$, with a catalytic contact material, such as a metal, a metal oxide or other suitable contact material. This chamber is heated to a temperature varying between about 400 and 500° C., according to the nature of the products treated.

The elements B, D, and E may be heated in any suitable manner. For example, elements B and E may be enclosed in suitable massive brick structures that are heated in any known manner by gases derived from the gasometer Y, hereinafter referred to, and the connecting pipe D can be heated for example, by enclosing the same within a jacket or the like heated by the same gases.

As the catalytic material at the end of a certain time becomes covered with a carbon deposit, it is necessary to regenerate it periodically, such regeneration being effected, in the known manner, by means of a current of air or oxygen and steam admitted by an annulus F. Moreover, by a series of pipes $f$ each ending in one of a number of roses G distributed at suitable intervals within the mass of catalytic material, the current of regenerating agent is thereby simultaneously distributed within the different zones of the chamber E and uniformly throughout the whole mass. The chamber comprises an outlet pipe H, furnished with a cock, for the vapours which have been subjected to a catalytic cracking, and a pipe I for the outlet of gases derived from the regeneration. Obviously the cock of the pipe H is closed when that of the pipe I and that of the admission of regenerating agent are open, and vice versa.

On leaving the catalytic cracking chamber the vapours are conducted by the pipe H into a purifying apparatus J, which preferably is arranged exactly like the catalytic cracking chamber and charged with a purifying agent such as a metal, for instance nickel or the like, or a metal oxide. In this purifier the cracked vapours are relieved of the major part of any impurities which they may contain, and particularly of the sulphur. The purifying material must be periodically regenerated by the known means of a blast of air or oxygen or other suitable agent. Preferably regeneration is effected simultaneously in the group of apparatus B—E—J.

The purifier J is maintained at a temperature in the neighbourhood of that of the catalytic cracking chamber E.

The cracked vapours having been subjected to as perfect a purification as possible, are conducted, by a pipe K, into a separator or dephlegmator L of any known construction. This separator is maintained at a temperature suitable for ensuring the separation of products boiling at a temepature above 230° C., or other selected temperature appropriate for the quality of the desired product. The separated products are collected at the lower portion of the apparatus, whilst the light products, in other words those boiling at a temperature below approximately 250° C., are separated off at the upper portion.

The heavy products evacuated at the lower portion of the apparatus through a siphon forming a liquid seal, $L^1$, pass to a second group of apparatus B—E—J, as shown in Fig. 1, wherein they are subjected, as in the first group, to vaporization followed by catalytic cracking and purification, the oulet of the purifier of such second group being connected to another dephlegmator. The heavy products from this last dephlegmator may be conducted to additional groups of apparatus for further treatment, or may have any suitable disposal. As indicated in dotted lines in Fig. 1, the groups of apparatus may be arranged in closed circuit for use with circular permutation, as above described.

The light products which escape from the dephlegmator L or from a series of dephlegmators belonging to successive groups, are conducted into a collector M from whence they are led into the refining apparatus which is thus combined with the plant which has just been described.

The group for refining comprises, at the inlet for the light products, a purifying contrivance similar to the purifier J. In such purifier N, the traces of impurities, which the light products derived from the several dephlegmators connected to the collector M, may contain are immediately held back.

As can be seen, the dephlegmators are thus preceded by inlet purifiers J and followed by outlet purifiers N. These latter are preferably charged with a purifying material, such as copper for example capable of yielding with the traces of sulphur carried by the vapours, a relatively stable compound. Obviously, the purifiers N must be maintained at a suitable temperature above that of the vapours derived from the dephlegmators, with a view to ensuring the functioning of the purifying masses under the best possible conditions. For this purpose, a heater O is arranged between the collector M and the purifiers N.

The light products, purified in N, are conducted by a pipe P, into a refining chamber Q, of a construction similar to that of the elements B, J, N and charged with a very active catalyst, nickel for example.

In this chamber, it suffices to maintain a temperature comprised between 180° and 200° C. for example, obviously variable according to the nature of the products and of the catalytic agent. The light products thus purified in the chamber N, then treated by a catalytic agent in the chamber Q, traverse on leaving this latter, a condenser R, wherein the most important part thereof is liquefied and collected at S.

From the receiver S, the non-condensible products proceed by a pipe T into an absorption chamber U, charged, in the known manner, with an absorbent material such as active carbon or oil. The non-absorbed products pass on by a pipe V into a chamber wherein, by agitation or other appropriate means, the ethylenic products are retained. Finally, the non-absorbed and non-retained permanent gases, are led, by a pipe X, into a gasometer Y, wherein they are collected for any suitable use.

The permanent gases containing a more or less large proportion of hydrogen, leaving the plant by the pipe X collected as above said in a gasometer, may serve advantageously for the regeneration of the purifying materials in the containers J. The regeneration is preferably effected by means of successive currents of air or oxygen and residual hydrogenous gases, by the method described in the patent application filed in the United States of America the 11th July 1927, Serial No. 204,887. Two currents of hydrogenous gas one preceding and one following a current of air or oxygen may eventually be employed.

Although the specific forms of some of the individual elements of the system have been described with considerable particularity, it is to be expressly understood that these forms have been shown and described for purposes of illustration only and that any suitable types of vaporizers, catalyzers, purifiers, etc., may be employed.

Although the terms "first" and "last" have been applied in the claims to certain of the treating or cracking units of the whole plant, it is to be expressly understood that these terms are purely arbitrary and have been used in order to aid in the description of a structure wherein a plurality of treating units are serially connected together so as to form a closed or continuous circuit, the condensate outlet of each and every dephlegmator having a conduit connection to the vaporizer inlet of some other unit, so that the plant may be operated by a cyclic or circular permutation of the units as previously described. The claims thus describe the structure of the complete treating plant which, by virtue of the various cocks provided in the respective conduits, can be connected in any suitable manner to form an operating series of units which excludes one or more of the total number of units comprising the entire plant. When referring to any particular operating series, however, it will be understood that the "first" unit is the one to which the starting material is introduced, and the "last" one is that from which the finally uncracked residue is collected, and that by virtue of the cyclic permutation feature of the apparatus, any one of the units of the plant may be the "first" in the operating series.

Claims:

1. In apparatus for treating hydrocarbons, a plant comprising three or more treating units serially arranged, each of said units comprising vaporizing means, catalyzing means, and dephlegmating means serially connected together in the order named, means connecting all of said units together to form a continuous circuit therethrough comprising conduits connecting each dephlegmating means with the vaporizing means of the next unit, including a connection between the dephlegmating means of the last unit and the vaporizing means of the first unit of the plant, a supply line for each of said vaporizers to supply material to be treated to the circuit, means whereby any of said units may be disconnected from the continuous circuit leaving the remaining units connected as an operating series, conduits connected to each dephlegmating means for withdrawing material from the circuit, and a refining unit connected to each of said withdrawing means.

2. In apparatus for treating hydrocarbons, a plant comprising three or more treating units serially arranged, each of said units comprising vaporizing means, catalyzing means, and dephlegmating means serially connected together in the order named, means connecting all of said units together to form a continuous circuit therethrough comprising conduits connecting each dephlegmating means with the vaporizing means of the next unit, including a connection between the dephlegmating means of the last unit and the vaporizing means of the first unit of the plant, a supply line for each vaporizing means to supply material to be treated to the circuit, means whereby any of said units may be disconnected from the continuous circuit leaving the remaining units connected as an operating series, means connected to each dephlegmating means to withdraw uncondensed vapors therefrom, and a refining unit connected to each of said withdrawing means comprising means for heating said vapors, catalyzing means, and condensing means.

3. In apparatus for treating hydrocarbons, a plant comprising three or more treating units serially arranged, each of said units comprising vaporizing means, catalyzing means, and dephlegmating means, serially connected together in the order named means connecting all of said units together to form a continuous circuit therethrough comprising conduits connecting each dephlegmating means with the vaporizing means of the next unit, including a connection between the dephlegmating means of the last unit and the vaporizing means of the first unit of the plant, a supply line for each vaporizing means to supply material to be treated to the circuit, means whereby any of said units may be disconnected from the continuous circuit leaving the remaining units connected as an operating series, means for withdrawing condensate from each of said dephlegmating means, means for withdrawing uncondensed vapors from each of said dephlegmating means, and a refining unit connected to each of said last named withdrawing means and comprising a heater for the vapors, a purifier, a catalyzer, and a condenser.

4. In apparatus for treating hydrocarbons, a plant comprising three or more treating units serially arranged, each of said units comprising vaporizing means, catalyzing means, and dephlegmating means serially connected together in the order named, means connecting all of said units together to form a continuous circuit therethrough comprising conduits connecting each dephlegmating means with the vaporizing means of the next unit, including a connection between the dephlegmating means of the last unit and the vaporizing means of the first unit of the plant, a supply line for each of said vaporizing means to supply material to be treated to the circuit, means whereby any of said units may be disconnected from the continuous circuit leaving the remaining units connected as an operating series, a heater connected into each supply line leading to said vaporizing means, and means connected to each of said vaporizing means to supply steam to the circuit.

In testimony whereof I have signed this specification.

ALFRED JOSEPH.